United States Patent Office 2,772,245
Patented Nov. 27, 1956

2,772,245

RESILIENT CELLULAR RESIN PRODUCTS

Eli Simon, Los Angeles, Frank W. Thomas, Burbank, and Welton R. Burney, Jr., West Los Angeles, Calif., assignors to Lockheed Aircraft Corporation, Burbank, Calif.

No Drawing. Application April 26, 1952,
Serial No. 284,654

18 Claims. (Cl. 260—2.5)

This invention relates to expanded or cellular products and relates more particularly to cellular resin or plastic products having flexible and resilient properties and to the formulations and methods for making the same.

Cellular plastics such as described in our earlier Patents Numbers 2,577,279, 2,577,280, 2,577,281 and 2,591,884 have been prepared by reacting a diisocyanate, a selected alkyd resin and a catalyst with or without additives and modifiers and cellular phenolic resin such as disclosed in Patent No. 2,446,429 have also been introduced. An important and valuable attribute of these earlier inventions was the ability of the mixed components or ingredients to react at room temperature and atmospheric pressure to foam up and form the cellular product or mass without the necessity of employing specially expansive pressure and/or temperature controlling equipment and these products could, if desired, be foamed in place to strongly adhere to practically any surface. However, the earlier cellular products of the types mentioned, and particularly the foamed cellular phenolic products, were rigid, unyielding, inelastic and often rather brittle.

It is an object of the present invention to provide expanded or cellular resin products that are yielding, resilient and flexible and, therefore, adapted for uses or applications for which the earlier expanded or foamed plastics of this general class were not suited. The resiliency or elastomeric properties, as well as the apparent density of the products of this invention may be varied at will by altering or modifying the formulations for preparing the same so that their physical characteristics are "tailored" or specially suited for given intended applications. The foams or cellular resin products may be compounded or prepared to vary from semi-hard materials to soft rubbery materials.

It is another object of the invention to provide expanded or cellular resin products of the character referred to that can be foamed in place at room temperature and at atmospheric pressure. In accordance with the invention the components or ingredients are merely mixed together to form a flowable reactant mixture and this mixture may be poured into a cavity or mold, onto a surface, or into place in a structure to react and foam up at atmospheric pressure to constitute an expanded or cellular resin product that is resilient and flexible and that dependably and strongly adheres to the surfaces which it contacts, unless they are previously provided with parting compounds, or the reactant mixture may be applied by blading, brushing, dipping, spraying, or the like, to react at room temperature and pressure to form a cellular flexible and resilient layer or body. Thus the reactant resin mixtures of the invention have the same ability as the earlier plastic expanded formulations mentioned above the react and foam up at atmospheric pressure to form a cellular body or mass and have the further or additional ability to produce yielding and resilient products that are effective in withstanding impact, etc. and that have applications as shock-absorbing and impact-receiving materials for which the earlier products are not suited.

Another object of the invention is to provide expanded or cellular resin products of the class referred to that have excellent dielectric properties and, therefore, are adapted for the wide usage in the electrical fields and the products of the invention have good thermal insulating characteristics to be well suited for applications where such insulation is required.

Other objectives and advantages of the present invention will become apparent from the following description which includes several examples or formulations that are intended primarily to be illustrative and typical and not restrictive in nature.

The principal or basic components of the present formulations for preparing the expanded or cellular plastic materials or products are castor oil; polyhydric alcohol, mono and diesters of fatty acids containing from 1 to 3 free OH groups per molecule; a diisocyanate; a catalyst and water. In addition to these ingredients, cell modifiers, such as metallic leafing powders and/or divalent or trivalent metallic soaps may be incorporated in the reactant mixture and, if desired, relatively small amounts of high molecular weight resins such as ethyl cellulose, chlorinated rubber, benzyl cellulose, etc., may be included to modify the strength characteristics of the products. Furthermore, modifying agents for controlling or altering the rigidity of the foamed or cellular plastics may be incorporated in the mixture, these including monohydric alcohols having from 6 to 12 carbon atoms, dihydric alcohols and ether alcohols such as ethylene glycol, diethylene glycol, triethylene glycol, propylene glycol, dipropylene glycol, hexamethylene glycol, ethyl hexylene glycol, butanediol-1,3, pentanediol-2,4 and 2-methylpentanediol-2,4, and polyethylene and propylene glycols.

The above named principal ingredients, with or without the additives or modifying agents, may be simply mixed together and allowed to react to form the cellular products without preliminary reaction of the constituents. However, in some cases some or all of the castor oil may be reacted with the diisocyanate prior to incorporation in the reactant foaming mixture or the polyhydric alcohol, mono and diesters of fatty acids may be pre-reacted with the isocyanate prior to inclusion in the reactant mixture, or both the castor oil and the polyhydric alcohol, mono and diesters of fatty acids, may be pre-reacted with the diisocyanate. In practice, it is preferred that either the castor oil or the polyhydric alcohol mono and diesters of fatty acids be prereacted with the isocyanate prior to admixture with the other ingredients to produce the cellular resin product, it being understood that where some or all of the castor oil or esters are thus pre-reacted with the isocyanate, the pre-reaction is not allowed to continue to the extent that the resultant "reaction product" is difficult to thus admix with the other ingredients. In practice we have found, that except for this matter of properly mixing the several ingredients, the extent of the pre-reaction and the temperature and pressure under which the reaction is effected have no effect upon the quality or physical properties of the final cellular reaction product.

The castor oil which constitutes the principal resin component or ingredient may be any good commercial grade of castor oil and as such consists primarily of the glycerides of ricinoleic and isoricinoleic acids, with small quantities of oleic, linoleic, stearic and dihydroxy-stearic acid glycerides. The castor oil is employed in the proportion of from 10 to 60% by weight of the total reactant mixture, the preferred proportion being about 35%. Where the castor oil is pre-reacted with the diisocyanate, that is reacted with the diisocyanate prior to incorporation in the reactant foaming mixture, it is used in the molal proportion of 1 mol of castor oil to from 1 to 10 mols of the diisocyanate, the preferred molar relation being 1 mol of castor oil to approximately 3 mols of the diisocyanate.

The polyhydric alcohol, mono and diesters of fatty acids containing 1, 2 or 3 free OH groups per molecule that may be employed in formulating the reactant foam producing mixture include:

(1) Glyceryl mono and diesters of saturated and unsaturated monocarboxylic fatty acids that may be represented as follows:

$$C_nH_{2n+1}COOH, C_nH_{2n-1}COOH, C_nH_{2n-2}COOH, \text{ and } C_nH_{2n-3}COOH$$

where $n$ may vary from 7 to 21.

and (2) Glycol and polyglycol monoesters of saturated and unsaturated monocarboxylic fatty acids that may be represented as follows:

$$C_nH_{2n+1}COOH, C_nH_{2n-1}COOH, C_nH_{2n-2}COOH, \text{ and } C_nH_{2n-3}COOH$$

where $n$ may vary from 7 to 21.

Typical of the first group or class 1 are: glyceryl monoricinoleate, glyceryl diricinoleate, glyceryl mono-oleate, glyceryl dioleate, glyceryl monolaurate, glyceryl monostearate, glyceryl monolinoleate and glyceryl monocaprylate. Included in the second enumerated class or group 2 are ethylene glycol monoricinoleate, ethylene glycol monoleate, propylene glycol monolaurate, diethylene glycol monostearate, diethylene glycol mono myristate, polyethylene glycol mono laurate, polyethylene glycol monoleate, polypropylene glycol monoricinoleate and polyethylene glycol monoricinoleate. The preferred molecular weight range of the polyglycols is from 200 to 600. The polyhydric alcohol mono and diesters of fatty acids are employed in the reactant foaming mixture in the proportion of from 10 to 60% of the total weight of the mixture and preferably in the amount of about 30%. When the polyhydric alcohol, mono and diesters of fatty acids are pre-reacted with the diisocyanate prior to incorporation in the reactant foaming mixture, the molal range is 1 mol of the polyhydric alcohol, mono and diesters of fatty acids to from ½ to 10 mols of the diisocyanate with the preferred range being 1 mol of the polyhydric alcohol, mono and diesters of fatty acids to approximately ½ to 5 mols of the diisocyanate.

The isocyanate employed in preparing the reactant foaming mixtures of the invention is preferably meta-toluene diisocyanate. The amount or proportion of the meta-toluene diisocyanate employed, including the meta-toluene diisocyanate that is pre-reacted with either or both the castor oil and the polyhydric alcohol, mono and diesters of fatty acids, is from 20 to 60% and preferably from about 25 to about 40% by weight of the total reactant mixture.

The catalysts that we have found to be most effective are alkaline catalysts that are soluble in the polyhydric alcohol, mono and diesters of fatty acids described above and which when in not greater than a 5% by weight concentration in an aqueous solution have a pH greater than 8. While the other catalysts described below have been found to be practical and effective in the preparation of the reactant mixtures of the invention, we usually prefer to employ the alkali metal salts of fatty acids represented by the following general formulae, where $n$ may vary from 7 to 21; $C_nH_{2n+1}COOH, C_nH_{2n-1}COOH, C_nH_{2n-2}COOH,$ and $C_nH_{2n-3}COOH$. Typical of this group of catalysts are potassium ricinoleate, potassium oleate, sodium tetradecanoate, lithium stearate, cesium laurate, potassium laurate, sodium linoleate and lithium caprylate. It is preferred that in the preparation of the catalysts (alkali metal salts of fatty acids) the alkali metal hydroxide be present at the beginning of the process. Thus in the production of glyceryl mono ricinoleate by re-esterification, as the reaction product between approximately 1 mol castor oil and 2 mols glycerol, the proper amount of alkali metal hydroxide is added at the start and the reaction carried out at between 160° and 230° C. for about 2 hours. Other catalysts that are effective in the reactant foaming mixtures of the invention include alkali metal salts, mono and disubstituted, of dimerized fatty acids, such as dilinoleic acid which may be prepared by heating the methyl esters of poly-unsaturated acids such as linoleic or linolenic acids at high temperatures. This may be represented diagrammatically by a Diels-Alder Reaction to form the dilinoleic acid-dibasic unsaturated acid—as follows:

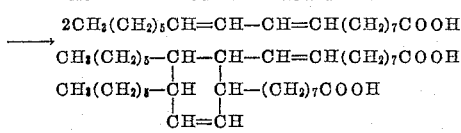

Alkali metal, mono unsubstituted, salts of monohydric and polyhydric phenols are also useful and effective as catalysts. These include:

Phenol
Resorcinol
Catechol 4,4'-dihydroxydiphenol 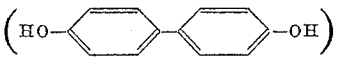

Nonyl phenol
Octyl phenol
P-tertiary amyl phenol

P-α cumyl phenol 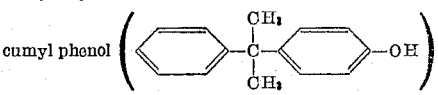

2-phenol cyclohexanol 

P-hydroxy benzophenone 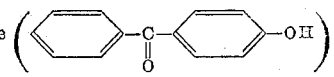

Other alkali metal salts, monodisubstituted, that have been found effective as catalysts for the reactant or foaming mixtures of the invention are the alcoholates of monohydric alcohols, having from 2 to 14 carbon atoms, and polyhydric alcohols and ether alcohols such as ethylene glycol, diethylene glycol, triethylene glycol, propylene glycol, dipropylene glycol, hexamethylene glycol, ethylhexylene glycol, butanediol-1,3, pentanediol-2,4, 2-methylpentanediol-2,4, and polyethylene and polypropylene glycols. Illustrative are the following: sodium and potassium ethylates, mono potassium glycerate, cesium butylate, mono lithium ethylene glycolate, and mono potassium derivative of hexamethylene glycol.

Another class or type of catalyst that we have found to be useful and effective are the alkaline solutions, having a pH greater than 8, of non-ionic wetting agents produced by ethylene oxide or propylene oxide, or mixtures thereof, condensation products with either a phenol or an alcohol containing substance. The following are illustrative of such non-ionic wetting agents:

(a) 6–30 mols ethylene oxide/mol of oleyl alcohol
(b) 6–20 mols ethylene oxide/mol of β-napthol
(c) 6–30 mols ethylene oxide/mol of dodecyl phenol
(d) 10–40 mols ethylene oxide/mol of castor oil
(e) 6–20 mols ethylene oxide-mol of di-isobutyl phenol.

If desired, in preparing certain of the catalysts, the alkali metal hydroxides may be substituted for at least equivalent amounts of base produced by hydrolysis of the various alkali metal salts, that is, the fatty acid salts, the phenolates and the alcoholates.

The selected catalyst is employed in the reactive resin mixtures in the proportion of from 0.25 to 15% and preferably in the amount of from 0.5 to 10%. However, if the alkali metal hydroxides are employed the catalyst concentration range is between 0.01 and 2%.

The concentration range of water in the reactive mixtures of the invention is from 0.1 to 5% and preferably from about 0.1 to about 3%, based on added water content as well as water present in the other ingredients.

The amounts or proportions of the various constituents or ingredients as given in this specification are in percentages (%) by weight based on 100 parts of the total mix or batch, unless otherwise specified.

As previously mentioned, metallic powders and metallic soaps may be incorporated in the reactant mixtures to control the size of the cells in the foamed or cellular resin products of the invention. The metallic powders that are effective for this purpose are preferably employed in the form of leafing powders of the following metals:

Aluminum
Aluminum bronze
Gold bronze
Copper bronze
Lead
Nickel
Silver
Gold
Copper
Stainless steel These leafing powders are employed individually or in suitable mixtures or blends in the proportion of from 0.1 to 6% and preferably in the proportion of from 0.2 to 3%. Good results are obtained when the mesh or fineness of the aluminum powders is such that not more than 2% is retained on a Number 325 sieve while the mesh or fineness of the other powders may be such that not more than 0.3% is retained on a Number 100 sieve. The divalent and trivalent metallic soap powders suitable for incorporation in the reactant mixture to control the cell size of the cellular products are metallic soap powders of fatty acids having from 12 to 20 carbon atoms such as:

Zinc stearate
Aluminum stearate
Calcium stearate
Magnesium stearate
Magnesium hydroxy stearate
Barium stearate
Zinc laurate
Calcium oleate
Strontium stearate The metallic soap powders may be used in the reactant mixtures individually or in blends or mixtures of the same in the proportion of from 0.1 to 10% and preferably in the amount of about 3%. Good results are obtainable when both a metallic leafing powder and a metallic soap powder, such as above described, are incorporated in the reactant castor oil-poly isocyanate mixture. When both the metallic leafing powder and metallic soap powder are used in the formulations of the invention, they are preferably employed in the proportion of from 0.2 to 10%, total.

The above mentioned high molecular weight thermoplastic film-forming polymeric resin additives which we have found to be useful in the formulations of the invention include:

Ethyl cellulose
Chlorinated natural rubber
Benzyl cellulose
Natural rubber
Vinyl chloride-vinyl acetate copolymers
Polyvinyl chloride
Polyvinyl acetate
Poly styrene
Poly dichloro styrene
Acrylate and methacrylate resins and their copolymers
Polyvinyl butyral In general, the concentration or proportion of the high molecular weight polymeric thermoplastic resin may range from 0.01 to 3% and is preferably from about 0.02 to about 1%. Ethyl cellulose has been found to be particularly desirable in the formulations of the invention. Satisfactory results are obtained using commercial grades of ethyl cellulose resins wherein the substitution values are between 2.15 and 2.60 ethoxyl groups for each glucose unit, that is where the ethoxyl content is from 35% to 50%. A preferred ethoxyl content range of the ethyl cellulose resin is from 45.0 to 49.5%. The viscosity of the ethyl cellulose resins which we employ is between 7 and 200 centipoises and preferably between 50 and 100 centipoises, the viscosity being determined from a 5% by weight concentration of the ethyl cellulose in a solution of from 70 to 80 parts by weight of toluene with from 30 to 20 parts by weight of ethanol (190 proof ethyl alcohol containing 0.5 gallon benzene for each 100 gallons of the alcohol). The high molecular weight resinous additives may be employed in the formulations individually but it is usually preferred to blend or mix them with the meta-toluene diisocyanate prior to incorporation in the reactant mixture. Thus in a given case or formulation the high molecular weight resin additive may be premixed and reacted with a portion of the meta-toluene diisocyanate that is to be used in the formulation, leaving the balance of the meta-toluene diisocyanate unblended. In other situations it may be desired to blend or react the high molecular weight resin additive with the total amount of the meta-toluene diisocyanate that is to be used. It is to be noted that the high molecular weight polymeric resin additives which we employ are soluble in the meta-toluene diisocyanate.

As previously described, the resiliency and rigidity of the cellular products of the invention may be varied or controlled by incorporating selected amounts of certain alcohols in the reactant mixtures. These alcohol additives include monohydric alcohols having from 6 to 12 carbon atoms, dihydric alcohols and ether alcohols such as ethylene glycol, diethylene glycol, triethylene glycol, propylene glycol, dipropylene glycol, hexamethylene glycol, ethyl hexylene glycol, butanediol-1,3, pentanediol-2,4 and 2-methylpentanediol-2,4, and propylene and polypropylene glycols. The alcohols when employed are used in the amount or proportion of from 1 to 10%.

The following examples are typical of the formulations for preparing the expanded or cellular resin reaction products of the invention. In these examples the component containing the catalyst is added to the premixture of the other components. The reaction of the mixtures is mildly exothermic and is rather rapid and requires no pre-heating for the forming of the cellular product and no post-heating for the curing of the product. However, both pre-heating at about 120° F. and post-curing at a temperature up to about 250° F. may be used to good advantage.

*Example 1*

| | Grams |
|---|---|
| Reaction product of 468 grams castor oil and 226 grams of meta-toluene diisocyanate | 100 |
| Water | 1 |
| Glyceryl monoricinoleate, containing from 5 to 15% by weight of potassium ricinoleate | 60 |

*Example 2*

| | |
|---|---|
| Reaction product of 100 grams castor oil and 100 grams meta-toluene diisocyanate | 100 |
| Water | ½ |
| Glyceryl monoricinoleate, containing from 5 to 15% by weight of potassium ricinoleate | 50 |

Example 3

| | Grams |
|---|---|
| Reaction product of 468 grams castor oil and 226 grams meta-toluene diisocyanate | 100 |
| Meta-toluene diisocyanate | 15 |
| Meta-toluene diisocyanate, containing 2 grams ethyl cellulose, of 45 to 49.5% ethoxy content and a 100 cps. viscosity, per 100 grams meta-toluene diisocyanate | 5 |
| Water | 1 |
| Glyceryl monoricinoleate containing from 5 to 15% by weight potassium ricinoleate | 60 |

Example 4

| | |
|---|---|
| Reaction product of 468 grams castor oil to 226 grams meta-toluene diisocyanate | 100 |
| Meta-toluene diisocyanate | 12.5 |
| Meta-toluene diisocyanate containing 2 grams ethyl cellulose, 45 to 49.5% ethoxy content and 100 cps. viscosity, per 100 grams meta-toluene diisocyanate | 7.5 |
| Water | 1.5 |
| Aluminum leafing powder, 422 mesh | 1 |
| Glyceryl monoricinoleate containing from 5 to 15% by weight potassium ricinoleate | 60 |

In Example 4 the other disclosed metallic leafing powders or mixtures thereof may be substituted for the aluminum leafing powder.

Example 5

| | Grams |
|---|---|
| Reaction product of 468 grams castor oil and 226 grams meta-toluene diisocyanate | 100 |
| Meta-toluene diisocyanate | 10 |
| Meta-toluene diisocyanate containing 2 grams ethyl cellulose, 45 to 49.5% ethoxy content, and 100 cps. viscosity, per 100 grams meta-toluene diisocyanate | 10 |
| Water | 2 |
| Glyceryl mono oleate containing 5% by weight potassium laurate | 60 |

Example 6

| | |
|---|---|
| Reaction product of 100 grams castor oil and 100 grams meta-toluene diisocyanate | 100 |
| Aluminum leafing powder, 422 mesh | 3 |
| Water | 1 |
| Glyceryl mono laurate containing 7% by weight lithium mono oleate | 70 |

Example 7

| | |
|---|---|
| Reaction product of 100 grams castor oil and 100 grams meta-toluene diisocyanate | 100 |
| Metal leafing powder | 4 |
| Water | 1.5 |
| Glyceryl mono oleate containing 10% by weight cesium monopalmitate | 50 |

Example 8

| | |
|---|---|
| Reaction product of 468 grams castor oil and 226 grams meta-toluene diisocyanate | 100 |
| Meta-toluene diisocyanate | 20 |
| Water | 1 |
| Aluminum leafing powder, 422 mesh | 4 |
| Glyceryl monoricinoleate containing from 5 to 15% by weight of potassium ricinoleate | 60 |

Example 9

| | |
|---|---|
| Reaction product of 468 grams castor oil and 226 grams meta-toluene diisocyanate | 100 |
| Meta-toluene diisocyanate containing 4 grams ethyl cellulose, 45 to 49.5% ethoxy content and 100 cps. viscosity per 100 grams meta-toluene diisocyanate | 20 |
| Water | 0.5 |
| Glyceryl monoricinoleate containing from 5 to 15% by weight potassium ricinoleate | 60 |

Example 10

| | |
|---|---|
| Reaction product of 468 grams castor oil to 226 grams meta-toluene diisocyanate | 100 |
| Meta-toluene diisocyanate | 15 |
| Meta-toluene diisocyanate containing 2 grams ethyl cellulose, 45 to 49.5% ethoxy content and 100 cps. viscosity, per 100 grams meta-toluene diisocyanate | 5 |
| Aluminum leafing powder, 422 mesh | 1 |
| Zinc stearate powder | 1 |
| Water | 1 |
| Glyceryl monoricinoleate containing from 5 to 15% by weight of potassium ricinoleate | 60 |

In the formulation of Example 10 any of the above described metallic soap powders or blends thereof may be substituted for the zinc stearate.

Example 11

| | Grams |
|---|---|
| Reaction product of 468 grams castor oil and 226 grams meta-toluene diisocyanate | 100 |
| Meta-toluene diisocyanate | 20 |
| Zinc stearate | 6 |
| Water | 1.5 |
| Glyceryl monoricinoleate containing from 5 to 15% by weight of potassium ricinoleate | 60 |

Example 12

| | Grams |
|---|---|
| Reaction product of 468 grams castor oil and 226 grams meta-toluene diisocyanate | 100 |
| Meta-toluene diisocyanate | 10 |
| Meta-toluene diisocyanate containing 2 grams ethyl cellulose, 45 to 49.5% ethoxy content and 100 cps. viscosity, per 100 grams meta-toluene diisocyanate | 10 |
| Metallic leafing powder | 1 |
| Water | 1.5 |
| Glyceryl monoricinoleate containing from 5 to 15% by weight potassium ricinoleate | 70 |

Example 13

| | |
|---|---|
| Reaction product of 468 grams castor oil and 226 grams meta-toluene diisocyanate | 100 |
| Meta-toluene diisocyanate | 20 |
| Meta-toluene diisocyanate containing 2 grams ethyl cellulose, 45 to 49.5% ethoxy content and 100 cps. viscosity, per 100 grams meta-toluene diisocyanate | 20 |
| Aluminum leafing powder, 422 mesh | 1 |
| Water | 0.75 |
| Glyceryl monoricinoleate containing from 5 to 15% by weight potassium ricinoleate | 60 |

Example 14

| | |
|---|---|
| Reaction product of 100 grams castor oil and 100 grams meta-toluene diisocyanate | 100 |
| Zinc stearate powder | 8 |
| Water | 2 |
| Glyceryl monoricinoleate containing from 5 to 15% by weight potassium ricinoleate | 50 |

Example 15

| | |
|---|---|
| Reaction product of 1 mol glyceryl monoleate and 2 mols meta-toluene diisocyanate | 70 |
| Castor oil | 67 |
| Metallic leafing powder | 2 |
| Water | 1 |
| Meta-toluene diisocyanate | 12.5 |
| Meta-toluene diisocyanate containing 2 grams ethyl cellulose, 45 to 49.5% ethoxy content and 100 cps. viscosity, per 100 grams meta-toluene diisocyanate | 7.5 |
| Glyceryl monoricinoleate containing from 5 to 15% by weight potassium ricinoleate | 24 |

Example 16

| | |
|---|---|
| Castor oil | 65 |
| Metallic leafing powder | 3 |
| Water | 1 |
| Meta-toluene diisocyanate | 45 |
| Meta-toluene diisocyanate containing 2 grams ethyl cellulose, 45 to 49.5% ethoxy content and 100 cps. viscosity, per 100 grams meta-toluene diisocyanate | 8 |
| Glyceryl monoricinoleate containing from 5 to 15% by weight potassium ricinoleate | 60 |

Example 17

| | |
|---|---|
| Reaction product between 1 mol castor oil and 2 mols meta-toluene diisocyanate | 100 |
| Reaction product between 2 mols glyceryl mono-laurate and 1 mol meta-toluene diisocyanate | 75 |
| Meta-toluene diisocyanate | 20 |
| Water | 1 |
| Potassium monoricinoleate | 10 |

Example 18

| | |
|---|---|
| Reaction product of 468 grams castor oil and 226 grams meta-toluene diisocyanate | 100 |
| Meta-toluene diisocyanate | 30 |
| Meta-toluene diisocyanate containing 2 grams ethyl cellulose, 45 to 49.5% ethoxy content and 100 cps. viscosity, per 100 grams meta-toluene diisocyanate | 30 |
| Aluminum leafing powder, 422 mesh | 1 |
| Water | 1 |
| Glyceryl monoricinoleate containing from 5 to 15% by weight potassium ricinoleate | 100 |

Example 19

| | |
|---|---|
| Reaction product between 200 grams castor oil, 25 grams meta-toluene diisocyanate containing 2 grams ethyl cellulose, 45 to 49.5% ethoxy content and 100 cps. viscosity per 100 grams meta-toluene diisocyanate and 175 grams meta-toluene diisocyanate | 100 |
| Water | 1 |
| Glyceryl monoricinoleate containing from 5 to 15% by weight potassium ricinoleate | 50 |

Example 20

| | Grams |
|---|---|
| Reaction product of 468 grams castor oil and 226 grams meta-toluene diisocyanate | 100 |
| Meta-toluene diisocyanate | 2.5 |
| Meta-toluene diisocyanate containing 2 grams ethyl cellulose, 45 to 49.5% ethoxy content and 100 cps. viscosity, per 100 grams meta-toluene diisocyanate | 7.5 |
| Water | 1.5 |
| Aluminum leafing powder, 422 mesh | 1 |
| Glyceryl monoricinoleate containing from 5 to 15% by weight potassium nonyl phenylate | 60 |

Example 21

| | Grams |
|---|---|
| Reaction product of 468 grams castor oil and 226 grams meta-toluene diisocyanate | 100 |
| Meta-toluene diisocyanate | 15 |
| Meta-toluene diisocyanate containing 2 grams ethyl cellulose, 45 to 49.5% ethoxy content and 100 cps. viscosity, per 100 grams meta-toluene diisocyanate | 5 |
| Water | 1 |
| Glyceryl monoricinoleate containing from 5 to 15% by weight lithium P-α cumyl phenylate | 60 |

Example 22

| | |
|---|---|
| Reaction product of 100 grams castor oil and 100 grams meta-toluene diisocyanate | 100 |
| Zinc stearate | 8 |
| Water | 2 |
| Glyceryl monoricinoleate containing from 5 to 15% by weight cesium butylate | 50 |

Example 23

| | |
|---|---|
| Reaction product of 468 grams castor oil and 226 grams meta-toluene diisocyanate | 100 |
| Meta-toluene diisocyanate | 20 |
| Meta-toluene diisocyanate containing 2 grams ethyl cellulose, 45 to 49.5% ethoxy content and 100 cps. viscosity, per 100 grams meta-toluene diisocyanate | 20 |
| Aluminum leafing powder, 422 mesh | 1 |
| Water | 0.75 |
| Glyceryl monoricinoleate containing from 5 to 15% by weight monosodium dilinoleate | 60 |

Example 24

| | |
|---|---|
| Reaction product between 1 mol propylene glycol mono-ricinoleate and 2 mols meta-toluene diisocyanate | 70 |
| Castor oil | 67 |
| Metallic leafing powder | 2 |
| Water | 1 |
| Meta-toluene diisocyanate | 12.5 |
| Meta-toluene diisocyanate containing 2 grams ethyl cellulose, 45 to 49.5% ethoxy content and 100 cps. viscosity, per 100 grams meta-toluene diisocyanate | 7.5 |
| Glyceryl monoricinoleate containing from 5 to 15% by weight potassium ricinoleate | 24 |

Example 25

| | |
|---|---|
| Reaction product of 468 grams castor oil and 226 grams meta-toluene diisocyanate | 100 |
| Meta-toluene diisocyanate | 12.5 |
| Meta-toluene diisocyanate containing 2 grams ethyl cellulose, 45 to 49.5% ethoxy content and 100 cps. viscosity, per 100 grams meta-toluene diisocyanate | 7.5 |
| Water | 1.5 |
| Metallic leafing powder | 1 |
| Diglycol laurate containing from 5 to 15% by weight potassium ricinoleate | 60 |

Example 26

| | |
|---|---|
| Reaction product of 468 grams castor oil and 226 grams meta-toluene diisocyanate | 100 |
| Meta-toluene diisocyanate | 10 |
| Meta-toluene diisocyanate containing 2 grams ethyl cellulose, 45 to 49.5% ethoxy content and 100 cps. viscosity, per 100 grams meta-toluene diisocyanate | 10 |
| Water | 1 |
| Metallic leafing powder | 0.5 |
| Propylene glycol monostearate | 20 |
| Glyceryl monolaurate | 40 |
| Potassium octyl phenolate | 6 |

Example 27

| | |
|---|---|
| Reaction product of 468 grams castor oil and 226 grams meta-toluene diisocyanate | 100 |
| Meta-toluene diisocyanate | 15 |
| Glyceryl monoricinoleate | 60 |
| Catalyst | 6.1 |

(The catalyst comprising 5 grams di-isobutyl phenol-ethylene oxide condensate to molecular weight of approximately 600, 1 gram water and ¾ gram potassium hydroxide.)

Example 28

| | Grams |
|---|---|
| Reaction product of 468 grams castor oil and 226 grams meta-toluene diisocyanate | 100 |
| Meta-toluene diisocyanate | 15 |
| Meta-toluene diisocyanate containing 2 grams ethyl cellulose, 45 to 49.5% ethoxy content and 100 cps. viscosity, per 100 grams meta-toluene diisocyanate | 5 |
| Diethylene glycol | 5 |
| Calcium stearate | 3 |
| Water | 3 |
| Glyceryl monoricinoleate containing from 5 to 15% by weight potassium ricinoleate | 50 |

Example 29

| | |
|---|---|
| Reaction product of 100 grams castor oil and 100 grams meta-toluene diisocyanate | 100 |
| Water | 1 |
| Glyceryl monoricinoleate | 50 |
| n-Octyl alcohol—potassium ricinoleate—nonionic wetting agent paste | 12 |

(The paste of Example 29 including 5 grams n-octyl alcohol, 5 grams potassium ricinoleate and 2 grams of the di-isobutyl phenol-ethylene oxide condensate of Example 27.)

Example 30

| | Grams |
|---|---|
| Reaction product between 1 mol glyceryl mono oleate and 2 mols meta-toluene diisocyanate | 70 |
| Castor oil | 50 |
| Poly ethylene glycol (molecular weight approximately 400) | 10 |
| Stainless steel leafing powder | 5 |
| Water | 1 |
| Zinc stearate | 3 |
| Meta-toluene diisocyanate | 20 |
| Glyceryl mono oleate containing 20% by weight potassium ricinoleate | 30 |

Example 31

(1)

| | |
|---|---|
| Reaction product of 468 grams castor oil and 226 grams meta-toluene diisocyanate | 100 |
| Meta-toluene diisocyanate | 12.5 |
| Meta-toluene diisocyanate containing 2 grams ethyl cellulose, 45 to 49.5% ethoxy content and 100 cps. viscosity, per 100 grams meta-toluene diisocyanate | 7.5 |
| Aluminum leafing powder, 422 mesh | 1 |

(2)

| | |
|---|---|
| Glyceryl monoricinoleate | 60 |
| Water | 1 |
| Alkali metal hydroxide (such as potassium hydroxide) | 0.5 |

Components 1 and 2 are pre-mixed separately and are then mixed together, adding Component 2 to Component 1.

Example 32

| | Grams |
|---|---|
| Reaction product of 468 grams castor oil and 226 grams meta-toluene diisocyanate | 100 |
| Meta-toluene diisocyanate | 12.5 |
| Meta-toluene diisocyanate containing 2 grams ethyl cellulose, 45 to 49.5% ethoxy content and 100 cps. viscosity, per 100 grams meta-toluene diisocyanate | 100 |
| Meta-toluene diisocyanate | 12.5 |
| Meta-toluene diisocyanate containing 2 grams ethyl cellulose, 45 to 49.5% ethoxy content and 100 cps. viscosity, per 100 grams meta-toluene diisocyanate | 7.5 |
| Water | 1.5 |
| Metallic leafing powder | 1 |
| Potassium hydroxide | 0.0004 |
| Glyceryl monoricinoleate | 60 |

Example 33

| | |
|---|---|
| Reaction product between 200 grams castor oil, 25 grams meta-toluene diisocyanate containing 2 grams ethyl cellulose (45 to 49.5% ethoxy content and 100 cps. viscosity, per 100 grams meta-toluene diisocyanate) and 175 grams meta-toluene diisocyanate | 100 |
| Water | 1 |
| Glyceryl monoricinoleate | 50 |
| Alkali metal hydroxide | 0.5 |

Example 34

| | |
|---|---|
| Reaction product of 468 grams castor oil and 226 grams meta-toluene diisocyanate | 100 |
| Meta-toluene diisocyanate | 5 |
| Meta-toluene diisocyanate containing 2 grams ethyl cellulose, 45 to 49.5% ethoxy content and 100 cps. viscosity, per 100 grams meta-toluene diisocyanate | 5 |
| Water | 1 |
| Glyceryl monoricinoleate | 60 |
| Alkali metal hydroxide | 0.5 |

Example 35

| | |
|---|---|
| Reaction product of 468 grams castor oil and 226 grams meta-toluene diisocyanate | 100 |
| Water | 1 |
| Glyceryl mono oleate | 60 |
| Alkali metal hydroxide | 0.5 |

In Example 32, 33, 34 and 35, as in Example 31, the glyceryl monorisinoleate, the water and the alkali metal hydroxide, are premixed as a second component, the other ingredients being pre-mixed as a first component and then said second component is added to the first component.

It should be understood that the invention is not to be based upon or dependent upon the theories which we have expressed. Nor is the invention to be regarded as limited to the express procedure or material set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissible in view of the prior art.

We claim:

1. The cellular material which is the product of reaction of a foaming composition comprising on a percentage by weight basis from 10 to 60% castor oil; from 10 to 60% of a glyceryl ester of fatty acids selected from the group consisting of glyceryl mono fatty acid esters and glyceryl di fatty acid esters; from 0.25 to 15% of an alkali metal salt of monocarboxylic fatty acids serving as a catalyst and soluble in said ester and which when in a 5% by weight aqueous solution has a pH greater than 8, the fatty acids of both said ester and said catalyst being selected from the group consisting of ricinoleic acid, oleic acid, lauric acid, stearic acid, linoleic acid and caprylic acid; from 20 to 60% meta-toluene diisocyanate; and from 0.1 to 5% water.

2. The cellular plastic material which is the product of reaction of a foaming composition comprising on an approximate percentage by weight basis from 10 to 60% castor oil; fro m10 to 60% of a glyceryl ester of fatty acids selected from the group consisting of glyceryl mono fatty acid esters and glyceryl di fatty acid esters; the fatty acids being selected from the group consisting of:

$C_nH_{2n+1}COOH$
$C_nH_{2n-1}COOH$
$C_nH_{2n-2}COOH$
$C_nH_{2n-3}COOH$ where in each instance $n$ may vary between 7 and 21; from 20 to 60% meta-toluene diisocyanate; from 0.25 to 15% of an alkaline catalyst soluble in said ester and which when in a 5% by weight concentration aqueous solution has a pH greater than 8, the catalyst being selected from the group consisting of alkali metal mono substituted salts and alkali metal di-substituted salts, said salts of said group being selected from the group consisting of:

Monocarboxylic acid
Unsaturated monocarboxylic acid
Dimerized fatty acid
Monohydric phenols
Polyhydric phenols
Monohydric alcohol
Polyhydric alcohol;

and from 0.1 to 5% water.

3. The cellular material which is the product of reaction of a foaming composition comprising on an approximate percentage by weight basis from 10 to 60% castor oil; from 10 to 60% of a glyceryl ester of fatty acids selected from the group consisting of glyceryl mono fatty acid esters and glyceryl di fatty acid esters; from 20 to 60% meta-toluene diisocyanate; from 0.25 to 15% of an alkali metal salt of fatty acids serving as a catalyst and soluble in said ester and which when in a 5% by weight aqueous solution has a pH greater than 8, the fatty acid of both said ester and said catalyst being selected from the group consisting of:

$C_nH_{2n+1}COOH$
$C_nH_{2n-1}COOH$
$C_nH_{2n-2}COOH$ and $C_nH_{2n-3}COOH$ where $n$ may vary from 7 to 21; and from 0.1 to 5% water.

4. The cellular material which is the product of reaction of a foaming composition comprising on an approximate percentage by weight basis from 10 to 60% castor oil; from 10 to 60% of a glyceryl ester of fatty acids selected from the group consisting of glyceryl mono fatty acid esters and glyceryl di fatty acid esters; from 20 to 60% meta-toluene diisocyanate; from 0.25 to 15% of an alkali metal salt of fatty acids serving as a catalyst and soluble in said ester and which when in a 5% by weight aqueous solution has a pH greater than 8, the fatty acid of both said ester and said catalyst being selected from the group consisting of:

$C_nH_{2n+1}COOH$
$C_nH_{2n-1}COOH$
$C_nH_{2n-2}COOH$ and $C_nH_{2n-3}COOH$ where $n$ may vary from 7 to 21; from 0.1 to 6% of a finely divided metal selected from the group consisting of:

Aluminum
Aluminum bronze
Gold bronze
Copper bronze
Lead
Nickel
Silver
Gold
Copper
Stainless steel and from 0.1 to 5% water.

5. The cellular material which is the product of reaction of a foaming composition comprising on an aproximate percentage by weight basis from 10 to 60% castor oil; from 10 to 60% of a glyceryl ester of fatty acids selected from the group consisting of glyceryl mono fatty acid esters and glyceryl di fatty acid esters; from 20 to 60% meta-toluene diisocyanate from 0.25 to 15% of an alkali metal salt of fatty acids serving as a catalyst and soluble in said ester and which when in a 5% by weight aqueous solution has a pH greater than 8, the fatty acid of both said ester and said catalyst being selected from the group consisting of:

$C_nH_{2n+1}COOH$
$C_nH_{2n-1}COOH$
$C_nH_{2n-2}COOH$ and $C_nH_{2n-3}COOH$ where $n$ may vary from 7 to 21; from 0.1 to 10% of metal soap powder selected from the group consisting of:

Zinc stearate
Aluminum stearate
Calcium stearate
Magnesium stearate
Magnesium hydroxy stearate
Barium stearate
Zinc laurate
Calcium oleate
Strontium stearate and from 0.1 to 5% water.

6. The cellular material which is the product of reaction of a foaming composition comprising on an approximate percentage by weight basis from 10 to 60% castor oil; from 10 to 60% of a glyceryl ester of fatty acids selected from the group consisting of glyceryl mono fatty acid esters and glyceryl di fatty acid esters; from 20 to 60% meta-toluene diisocyanate; from 0.25 to 15% of an alkali metal salt of fatty acids serving as a catalyst and soluble in said ester and which when in a 5% by weight aqueous solution has a pH greater than 8, the fatty acid of both said ester and said catalyst being selected from the group consisting of:

$C_nH_{2n+1}COOH$
$C_nH_{2n-1}COOH$
$C_nH_{2n-2}COOH$ and $C_nH_{2n-3}COOH$ where $n$ may vary from 7 to 21; from 0.01 to 3% of a high molecular weight resin additive soluble in meta-toluene diisocyanate and selected from the group consisting of:

Ethyl cellulose
Chlorinated natural rubber
Benzyl cellulose
Natural rubber
Polyvinyl acetate
Polyvinyl chloride
Poly styrene
Poly dichloro styrene
Polyvinyl butyral
Vinyl chloride-vinyl acetate copolymers;

and from 0..1 to 5% water.

7. The cellular material which is the product of reaction of a foaming composition comprising on an approximate percentage by weight basis from 10 to 60% castor oil; from 10 to 60% of a glyceryl ester of fatty acids selected from the group consisting of glyceryl mono fatty acid esters and glyceryl di fatty acid esters; from 20 to 60% meta-toluene diisocyanate; from 0.1 to 3% ethyl cellulose having an ethoxyl content of from 45 to 49.5% and a viscosity of between 7 and 200 as determined from a 5% by weight concentration in a solution of from 70 to 80 parts toluene with from 30 to 20 parts by weight ethanol; from 0.25 to 15% of an alkali metal salt of fatty acids serving as a catalyst and soluble in said ester and which when in a 5% by weight aqueous solution has a pH greater than 8, the fatty acid of both said ester and said catalyst being selected from the group consisting of:

$$C_nH_{2n+1}COOH$$
$$C_nH_{2n-1}COOH$$
$$C_nH_{2n-2}COOH$$

and $$C_nH_{2n-3}COOH$$

where $n$ may vary from 7 to 21; and from 0.1 to 5% water.

8. The cellular material which is the product of reaction of a foaming composition comprising on an approximate percentage by weight basis from 10 to 60% castor oil; from 10 to 60% of a glyceryl ester of fatty acids selected from the group consisting of glyceryl mono fatty acid esters and glyceryl di fatty acid esters; from 20 to 60% meta-toluene diisocyanate; from 0.25 to 15% of an alkali metal salt of fatty acids serving as a catalyst and soluble in said ester and which when in a 5% by weight aqueous solution has a pH greater than 8, the fatty acid of both said ester and said catalyst being selected from the group consisting of:

$$C_nH_{2n+1}COOH$$
$$C_nH_{2n-1}COOH$$
$$C_nH_{2n-2}COOH$$

and $$C_nH_{2n-3}COOH$$

where $n$ may vary from 7 to 21; from 1 to 10% of a monohydric alcohol having from 6 to 12 carbon atoms; and from 0.1 to 5% water.

9. The cellular material which is the product of reaction of a foaming composition comprising on an approximate percentage by weight basis 10 to 60% of the reaction product of from 1 mol castor oil to 3 mols meta-toluene diisocyanate; from 10 to 60% of a glyceryl ester of fatty acids selected from the group consisting of glyceryl mono fatty acid esters and glyceryl di fatty acid esters; from 20 to 60% meta-toluene diisocyanate; from 0.25 to 15% of an alkali metal salt of fatty acids serving as a catalyst and soluble in said ester and which when in a 5% by weight aqueous solution has a pH greater than 8, the fatty acid of both said ester and said catalyst being selected from the group consisting of:

$$C_nH_{2n+1}COOH$$
$$C_nH_{2n-1}COOH$$
$$C_nH_{2n-2}COOH$$

and $$C_nH_{2n-3}COOH$$

where $n$ may vary from 7 to 21; and from 0.1 to 5% water.

10. The cellular material which is the product of reaction of a foaming composition comprising on an approximate percentage by weight basis from 10 to 60% castor oil; from 10 to 60% of the product of reaction of 1 mol of a glyceryl ester of fatty acids selected from the group consisting of glyceryl mono fatty acid esters and glyceryl di fatty acid esters; and from 0.5 to 10 mols meta-toluene diisocyanate; meta-toluene diisocyanate, the total amount of the meta-toluene diisocyanate including that contained in said product of reaction being between 20 and 60%; from 0.25 to 15% of an alkali metal salt of a fatty acid soluble in said ester and which when in a 5% by weight aqueous solution has a pH greater than 8, said salt serving as a catalyst; the fatty acid of both said ester and catalyst being selected from the group consisting of:

$$C_nH_{2n+1}COOH$$
$$C_nH_{2n-1}COOH$$
$$C_nH_{2n-2}COOH$$

and $$C_nH_{2n-3}COOH$$

where $n$ may vary from 7 to 21; and from 0.1 to 5% water.

11. The cellular material which is the final reaction product of the foaming composition which comprises on an approximate part by weight basis; 100 parts of the reaction product of about 468 parts castor oil and about 226 parts meta-toluene diisocyanate; 12.5 parts meta-toluene diisocyanate; 7.5 parts of meta-toluene diisocyanate containing 2 parts by weight of ethyl cellulose having an ethoxy content of from 45 to 49.5% and a viscosity of about 100 centipoises as determined from a 5% by weight concentration in a solution of from 70 to 80 parts toluene with from 30 to 20 parts by weight ethanol of 95% strength for each 100 parts of the meta-toluene diisocyanate; 1.5 parts water; 60 parts of a glyceryl ester of fatty acids selected from the class of said esters that are mono-esters and di-esters, said glyceryl ester containing from 5 to 15% by weight potassium ricinoleate.

12. The cellular material which is the final reaction product of the foaming composition which comprises on an approximate part by weight basis; 100 parts of the reaction product of about 468 parts castor oil and about 226 parts of meta-toluene diisocyanate; 12.5 parts meta-toluene diisocyanate; 7.5 parts of meta-toluene diisocyanate containing 2 parts by weight of ethyl cellulose having an ethoxy content of from 45 to 49.5% and a viscosity of about 100 centipoises as determined from a 5% by weight concentration in a solution of from 70 to 80 parts toluene with from 30 to 20 parts by weight ethanol of 95% strength for each 100 parts of the meta-toluene diisocyanate; 1.5 parts water; 60 parts of a glyceryl ester of fatty acids selected from the class of said esters that are mono-esters and di-esters, said glyceryl ester containing from 5 to 15% by weight of an alkaline catalyst selected from the group of alkali metal salts of fatty acids selected from the group consisting of:

$$C_nH_{2n+1}COOH$$
$$C_nH_{2n-1}COOH$$
$$C_nH_{2n-2}COOH$$

and $$C_nH_{2n-3}COOH$$

where $n$ may vary from 7 to 21.

13. The cellular material which is the product of reaction of a foaming composition comprising on a percentage by weight basis from 10 to 60% of the reaction product of from 1 mol castor oil to 3 mols meta-toluene diisocyanate; from 10 to 60% of a glyceryl ester of fatty acids selected from the class of said esters that are mono-esters and di-esters; from 20 to 60% meta-toluene diisocyanate; from 0.25 to 15% of potassium ricinoleate; and from 0.1 to 5% water.

14. The cellular material which is the final product of reaction of a foaming composition comprising on an approximate part by weight basis; 100 parts of the reaction product of about 468 parts castor oil and about 226 parts meta-toluene diisocyanate; 1 part water; and 60 parts glyceryl mono ricinoleate containing from 5 to 15% by weight potassium ricinoleate.

15. The cellular material which is the final reaction product of the foaming composition which comprises on an aproximate part by weight basis; 100 parts of the reaction product of about 468 parts castor oil and about 226 parts meta-toluene diisocyanate; 12.5 parts meta-toluene diisocyanate; 7.5 parts of meta-toluene diisocyanate containing 2 parts by weight of ethyl cellulose having an ethoxy content of from 45 to 49.5% and a viscosity of about 100 centipoises as determined from a 5% by weight concentration in a solution of from 70 to 80 parts toluene with from 30 to 20 parts by weight ethanol for each 100 parts of the meta-toluene diisocyanate; 1.5 parts water; 1 part aluminum leafing powder; and 60 parts glyceryl monoricinoleate, containing from 5 to 15% by weight potassium ricinoleate.

16. The cellular material which is the final reaction product of the foaming composition which comprises on an approximate part by weight basis; 100 parts of the reaction product of about 468 parts castor oil and about 226 parts meta-toluene diisocyanate; 20 parts meta-toluene diisocyanate; 6 parts zinc stearate; 1.5 parts water; and 60 parts glyceryl monoricinoleate containing from 5 to 15% by weight of potassium ricinoleate.

17. The cellular material which is the final reaction product of the foaming composition which comprises on an approximate part by weight basis; 100 parts of the reaction product of about 100 parts castor oil and 100 parts meta-toluene diisocyanate; 8 parts zinc stearate powder; 2 parts water; and 50 parts glyceryl monoricinoleate containing from 5 to 15% by weight of potassium ricinoleate.

18. The cellular material which is the final reaction product of the foaming composition which comprises on an approximate part by weight basis; 70 parts of the reaction product of 1 mol glyceryl monoleate and 2 mols meta-toluene diisocyanate; 67 parts castor oil; 2 parts metallic leafing powder; 1 part water; 12.5 parts meta-toluene diisocyanate; 7.5 parts meta-toluene diisocyanate containing 2 parts ethyl cellulose of from 45 to 49.5 ethoxy content and having a viscosity of about 100 centipoises as determined in a solution of from 70 to 80 parts toluene with from 30 to 20 parts ethanol of 95% for each 100 parts of the meta-toluene diisocyanate; and 24 parts glyceryl monoricinoleate containing from 5 to 15% by weight potassium ricinoleate.

References Cited in the file of this patent

UNITED STATES PATENTS 2,602,783     Simon et al. _____ July 8, 1952

OTHER REFERENCES

Modern Plastics, Polyurethons, June 1947, pages 149–152, 250, 252, 254, 256, 258, 260, 262.

Chemical Engineering, April 1950, pages 165–166.

The Chemical Age, pages 481–484, March 31, 1951.

Interview with Bayer, Office Tech. Services, PB 45,246, Jan. 31, 1947.